United States Patent Office 3,044,860
Patented July 17, 1962

3,044,860
LUBRICATING OIL DETERGENCY TESTING
Guy M. Verley, Harvey, Ill., assignor to Sinclair Research, Inc., a corporation of Delaware
No Drawing. Filed May 18, 1959, Ser. No. 813,649
14 Claims. (Cl. 23—230)

This invention is a laboratory bench test for engine oil low temperature detergency. About 75 percent of the Nation's passenger cars and delivery vehicles operate under light service stop and go driving conditions. Current detergents, developed to prevent crankcase deposit accumulations under high speed, heavy duty conditions, do not necessarily prevent deposits under light service conditions. The use of this test allows rapid screening of a large number of materials and predicts their ability to function as low temperature sludge inhibitors and dispersants, and thereby to maintain a clean engine in service.

The formation of sludge in the crankcase oil of gasoline and, to a lesser extent, diesel engines is of considerable practical significance. The presence of an undue quantity of sludge can eventually cause blocking of the small clearances in the oil ways and ducts designed to allow a supply of lubricant to flow over rubbing surfaces. The consequent reduction or stoppage in the lubricant supply will cause heavy wear and ultimate break-down of the engine. The formation of sludge and subsequent engine deposits became a problem first with the appearance of the high speed diesel engine. Alkaline earth metal salts of phenols, phenol sulfides and sulfonic acids were developed at that time to control ring belt deposits in diesel engines. The use of these metallic detergent additives spread to crankcase oils for gasoline engines when greater compression ratios and power output increased service severity.

The trend of gasoline engines is toward greater power output with corresponding greater cooling capacity and greater compression ratios, but today's traffic congestion restricts the use of this available power to a small, intermittent fraction. As a result more than 50 million passenger cars and delivery trucks are operated normally at low temperature, stop and go service conditions. Metallic detergents, which are valuable to control engine deposits at high load, high temperature sustained service, fail to control sludge accumulation at low temperature stop and go service. A family of new detergent additives is necessary to lubricate gasoline engines under today's prevalent conditions. Availability of a reliable detergency bench test for crankcase oils will greatly accelerate the development of additives by screening rapidly a great number of possible compounds and blends.

Since crankcase conditions are not severe enough to crack and to oxidize oil into low molecular weight organic material, it is concluded that the sludge found in carbureted engines is formed principally from fuel combustion residues passing down into the crankcase with some exhaust gas and is not caused to any appreciable extent by oxidative deterioration products of the lubricating oil itself. The formation is enhanced by the less volatile components in cracked naphtha, by most fuel additives, by ineffective piston seals, and by poor crankcase ventilation. These factors favor the concentration of fuel-derived reactive intermediates in the crankcase which act as precursors for the formation of sludge. It is not surprising, therefore, that low temperatures, favoring as they do crankcase oil dilution, will also promote sludge formation and that engine operation under these conditions is an important practical problem.

A dirty engine may contain 400–700 g. of sludge deposited in the crankcase, push-rod, rocker-arm and timing gears areas; 10–50 g. of lacquer and piston ring deposits; 30–100 g. of combustion chamber deposits; and variable amounts of intake valve and manifold deposits. Sludge and lacquer deposited at coolant and crankcase temperatures lower than 180° F.—"low temperature sludge"—is an emulsion of about 20% oil insoluble material in 80% of oil. The oil insoluble material is comprised of about 50% of organic insolubles and 50% of inorganic salts, contaminated with water. Water concentration and temperature control the deposits appearance, which varies from a soft emulsion to a plastic-like lacquer. Lacquer has the same composition as the organic insolubles emulsified into sludge.

For example, a sample of oil from the crankcase of an automobile used under light service conditions was separated into five fractions by a combination of decantation, solvent extraction and percolation to give the following average fractions:

TABLE I

| Inorganic | | Organics (98.4%) | | |
|---|---|---|---|---|
| Oil Insoluble, Acetone Insoluble | Oil Insoluble, Acetone Insoluble | Oil Insoluble, Acetone Soluble | Oil Soluble, Acetone Soluble | Purified Oil |
| 1.6% 58 g. | 0.32% 13 g. | 1.28% 53 g. | 7.5% 310 g. | 89.3% 3,731 g. |

The inorganic fraction isolated from field engines lubricated by a heavy duty low viscosity index mineral oil blend and powered by leaded gasoline, consists mainly of lead chlorobromide, barium and zinc phosphates and barium sulfate, contaminated by salts and oxides of engine metals. The major analytical differences between the organic fractions, isolated from engines lubricated with SAE-10 mineral oil, are illustrated in Table II.

TABLE II

Major Differences Between Organic Fractions

| Fraction | A Oil Soluble Acetone Soluble | B Oil Insoluble Acetone Soluble | C Oil Insoluble Acetone Insoluble |
|---|---|---|---|
| Percent C | 84.77 | 71.3 | 85 |
| Percent H | 9.51 | 8 | 3 |
| Percent O | 2.7 | 12.8 | 9.5 |
| Percent N | 0.51 | 1.7 | 1.0 |
| Percent S | 3.07 | 2.4 | 1.5 |
| Acid Number | 33 | 40 | |
| Sap. Number | 42.6 | 200 | |
| Mol. Weight | 260 | 1500 | >2,000 |

It was found that the oil insoluble precipitate of type B may be formed in the laboratory by heating fraction A to 150–210° F. Nitrogen, oxygen and esters are concentrated in the precipitate, which stops forming when the nitrogen of A is depleted to 0.04%. Similarly, acetone soluble precipitate B is transformed by heating above 210° F. into acetone insoluble C. Some nitrogen and oxygen are lost during this baking process. Upon heating filtered crankcase drains, a precipitate develops, whereas the same crankcase drains, purified by removal of fraction A, do not form precipitates. Fraction A, therefore, contains oil soluble, low molecular weight, sludge precursors.

These precursors are difficult to isolate from used crankcase oils, but engine tests to evaluate sludging tendencies of fuels showed that the heavy end of cracked gasoline contributes most of the sludge. Even a clean-running gasoline will produce more sludge when it has added to it minor amounts of (a) diolefins (butadiene, cyclopentadiene, vinyl cyclohexene, alpha-methyl-styrene), (b) aromatic amines (di-sec-butyl phenylene diamine), (c) peroxides (t-butyl hydroperoxide) or (d) phenols. Sludge deposits are not changed by sulfur dioxide extraction of aromatics or by the addition of sulfur compounds extracted from gasoline. Sludge deposits decrease slightly by the addition of mono-olefins (di-isobutylenes, heptenes). The build-up of sludge precursors in the crankcase requires much engine time during which the most reactive fraction of sludge precursors is polymerized into sludge.

In the novel test method of this invention a sludge precursor gasoline fraction is added to the mineral lubricating oil to be tested and the mixture is subjected to the action of $NO_2$-containing gas. The effectiveness of detergent oils in preventing sludge deposition in this test has been shown to correlate with field data on several reference oils. The sludge precursor concentration in the oil can vary between about 5 and 50%. About 5 to 20% concentration of the precursor fraction in the oil is preferred. The test is most conveniently run between about 150° and 250° F. for about 30 minutes to 1500 hours, although temperatures in the range of about 50° F. to 400° F. may be used. By increasing the test temperature to about 250–300° F., varnish can be developed in the test apparatus above the liquid level.

Sludge precursors, suitable for test purposes, can be synthesized by partial oxidation of gasoline fractions or naphthas under non-combustive conditions. The preferred naphtha is a cracked gasoline fraction boiling predominantly in the range of about 300–425° F. The partial oxidation of this naphtha is catalyzed by well known oxidation catalysts, usually compounds of metals of atomic numbers of 24 to 29, and can be conducted batchwise at atmospheric pressure in the presence of soluble catalysts such as cobalt, lead or copper napthenates or preferably continuously by passing the naphtha and air under pressure over a bed of cobalt-on-silica catalyst.

The pressure in the oxidation can be about 10 to 1500 p.s.i.a., the oxygen can vary from about 0.25 to 5 moles per mole of naphtha, the bed temperature from about 250 to 500° F., and the space velocity (weight of feed per weight of catalyst per hour) from about 0.5 to 5. Preferred conditions are 1 mole of oxygen per mole of naphtha, 350–375° F., 800 p.s.i.a., 1.2 to 1.5 space velocity, cobalt-on-silica catalyst. Under the preferred conditions the oxidation products remain for the most part soluble in the naphtha, whereas the acid number reaches about 3 to 25, preferably about 10–15. This partially oxidized naphtha is then mixed with the oil to be tested in the proportions of about 5 to 50% by volume, preferably about 5 to 20%. The sludge precursors may be synthesized in large batches, say enough for 100 tests, and stored at about 0° C. to minimize spontaneous polymerization of the most active components.

The mineral oil base stock of lubricating viscosity which may be tested by the method of this invention can be, for instance a solvent extracted or solvent refined oil obtained in accordance with conventional methods of solvent refining lubricating oils. Generally, lubricating oils have viscosities from about 20 to 250 S.U.S. at 210° F. The base oil may be derived from paraffinic, naphthenic, asphaltic or mixed base crudes and if desired, a blend of solvent refined Mid-Continent neutrals and Mid-Continent bright stocks may be employed. A popular lubricant is a solvent treated Mid-Continent neutral having a viscosity index of about 95. This lubricant may contain extreme pressure agents, viscosity index improvers, oxidation inhibitors, etc. It also will, of course, contain the additives to be tested, in varying and minor amounts.

Sludge-forming conditions are established in the test lubricant by contacting the mixture of lubricant and sludge precursors with a nitrogen dioxide containing gas. Since $NO_2$ gas itself is difficult to handle it is preferably formed simultaneously with the test. This can be done easily by mixing nitric oxide and oxygen, usually in a proportion of about 10 to 20 liters or more of oxygen to a liter of nitric oxide, and allowing them to react before feeding to the lubricant. An inert diluent gas, for example, carbon dioxide or nitrogen, may be included in the gas mixture, and preferably constitutes the major proportion. Although the nitrogen dioxide need be present only in minute amounts in the gas mixture, its presence is critical to proper use of the test method of this invention since sludge precursors do not increase dirtiness unless nitrogen oxides are present.

In a preferred mode of conducting the test method of this invention, the oxygen, nitric oxide and diluent gas are metered individually to a mixing chamber which may be a coil where nitrogen dioxide is formed before passing into the oil. Nitrogen is the preferred diluent gas and the nitrogen and oxygen may be conveniently supplied by air. The nitric oxide concentration may vary from about .05 to 1.0 liter/hr./100 g. of oil-precursor mixture, and about 0.1 to 0.4 liter/hr./100 g. is preferred. The oxygen concentration may vary from about 0.5 to 10 liters/hr./100 g. of precursor-oil mixture with about 2 to 6 liters/hr./100 g. preferred. The nitrogen concentration can vary between 0 and 50 liters/hr./100 g. oil. Four to seven liters/hr./100 g. are preferred. The gas mixture in order to give accurate results, should be substantially free of any organic sludge forming materials, such as partially oxidized fuel, etc.

Laboratory synthesis of sludge is possible by passing air containing 0.5% $NO_2$ through oil contaminated with 10% partially oxidized naphtha and maintained at 210° F. Once the optimum conditions for laboratory deposition of sludge are established, additives can be evaluated by the amount of deposits trapped on steel wool plugs of standard weight, or by the total amount of insolubles formed when experimental amounts of additives are mixed with the oil. The amount of sludge deposited on the test tube walls is an excellent indication of the lubricant's ability to keep engines clean in service; the less sludge deposited the better the detergency.

A test may be, for example, conducted as follows:

(1) Oxidize a thermally cracked gasoline cut (B.P. 300–425° F.) by 1 mole of oxygen per 2 moles of gasoline at 350–400° F. and 800 p.s.i., in a flow system, using a solid oxide oxidation catalyst.

(2) Pass 5 liters per hour of a mixture of 80% nitrogen, 19.5% oxygen, and 0.5% NO through 100 g. of the following test material maintained at 210° F. for 6 hours:

(a) SAE 10 uncompounded oil (blank)
(b) Oil+10% oxidized gasoline cut
(c) Oil+10% oxidized gasoline+various concentrations of standard additives
(d) Compounded oils of known engine ratings+10% oxidized gasoline to determine the correlation with engine tests.

(3) Study sludge deposition on metal panels or on steel wool and/or measure the weight of insolubles formed. Also note whether the test lubricant, upon standing, is cloudy, hazy or clear.

Means for conducting the test are apparent to one skilled in the art. A preferred apparatus consists essentially of a test tube of 250 ml. capacity heated to constant temperature by a refluxing liquid and equipped with a reflux condenser. Nitrogen, oxygen and nitric oxide are metered separately and mixed in a ¼" stainless steel coil 10 ft. long where nitrogen dioxide is formed before passing through the test oil in the tube. Spent gases are exhausted through a vent.

EXAMPLE

An illustrative but not limiting example of the use of the method of the invention is as follows:

A catalytically cracked naphtha of 300–400° F. boiling range is continuously oxidized under non-combustive conditions over a catalyst bed of cobalt-on-alumina at a space velocity of 1.3 (grams of feed per gram of catalyst per hour), temperature 370–380° F., pressure 88 p.s.i.g., 1 mole of oxygen per mole of naphtha.

After decantation of the small percentage of oxidation sludge the clear sludge precursor-gasoline mixture analyzed: 84.27% C, 11.95% H, 3.78% $O_2$ (by difference), acid number 12.39, ASTM pentane insolubles 1.763%. Duplicate runs give acid numbers between 10 and 13.

80 g. of test lubricant, contaminated with 20 g. of the naphtha treated as above, is charged to a test tube. A mixed stream of nitrogen (6.7 liters/hr.), oxygen (3 liters/hr.) and nitric oxide (0.3 liter/hr.) is passed through the test oil for 5 hours at 200° F. At the end of 5 hours' exposure, the oxygen and the nitric oxide feed are stopped. The nitrogen feed is continued for half an hour at which time the apparatus is dismantled. After 16 hours' standing at room temperature the test oil is poured into a 4 oz. sample bottle. ASTM pentane insolubles and neutralization number are determined. After 10 days' standing the appearance of the oil in the sample bottle is noted. The sample is shaken by hand at room temperature, then heated to 160° F. and shaken to determine the re-dispersibility of the sludge deposited on the bottom of the sample bottle at room temperature and at 160° F. The oil in the sample bottle is then discarded. The test tube is rinsed twice with hexane at room temperature after the 16 hours' standing and the adherent sludge deposits rated visually. After rating, the sludge is washed out with acetone, dried under infra-red heat in a stream of air, washed oil-free with hexane and dried to constant weight. The weight of dry sludge is reported.

Three different zones of sludge deposition are observed on the test tube: (1) at liquid level, (2) below liquid level along the vertical sides, and (3) at the bottom. Each zone is rated separately in demerits from 0, perfectly clean, to 100, maximum dirtiness. The demerits are averaged and subtracted from 100 in order to match the merit rating scale used by the Coordinating Research Council merit procedure for evaluating engine cleanliness. A rating of 100 is perfectly clean, 0 is the maximum dirtiness to be expected.

To show the reproducibility of this test method, two different batches, A and B, of synthetic sludge precursors were added in concentrations of 0, 5, 10, 15 and 20 weight percent to the same base oil and tested in duplicate test stands by the described procedure. Table III shows excellent reproducibility of the test results.

TABLE IIII

| Lubricant | Contaminant A Acid #12.2 | Contaminant B Acid #10.7 |
|---|---|---|
| Base Oil plus 0 Wt. Percent Contaminant | 100 | 100 |
| Base Oil plus 5 Wt. Percent Contaminant | 67 | 77 |
| Base Oil plus 10 Wt. Percent Contaminant | 53 | 57 |
| Base Oil plus 15 Wt. Percent Contaminant | 33 | 37 |
| Base Oil plus 20 Wt. Percent Contaminant | 14 | 20 |
| Excellent 10W-30 Crankcase Oil | 93 | 95 |
| Poor 10W-30 Crankcase Oil | 53 | 57 |

The base oil is not affected appreciably by the test conditions. The ratings and the weight of sludge adhering to the test tube are proportional to the percentage of contaminant (sludge precursors) added. Contaminant B with the lower acid number gave consistently slightly higher ratings than contaminant A. Included in Table III are figures for duplicate tests of a poor and an excellent 10W-30 crankcase lubricant which shows good reproducibility also. Contaminant B, with the lower acid number, gives consistently slightly higher ratings than contaminant A.

Table IV, below, shows the results given by the test method of the invention as compared to detergency field tests made upon the same lubricating oils as well as the results of tests on these same oils made in the crankcase of an engine in the laboratory.

Reference oil REO-132 is a 10W-30 solvent extracted Mid-Continent oil containing a V.I. improver and an oxidation inhibitor. Reference oil REO-133 is a 10W-30 solvent extracted Mid-Continent oil containing a V.I. improver, an oxidation inhibitor and a dispersant. Reference oils REO-137 and REO-138 are 10W-30 oils containing detergent additives, having good engine performance and having an appreciable sludge rating spread between them.

Oils REO-132 and REO-133 were field tested and the results given below are the average of three engines. Oils REO-137 and REO-138 were field tested in a taxicab fleet. Each of these two latter oils was run in two 1956, 6 cylinder Chevrolet cars employing the same fuel and 5000-mile oil changes. The test on REO-137 was run for 45,000 miles but the test on REO-138 was stopped after 25,000 miles due to the large amount of sludge deposits formed in the engine. Table IV compares the field test sludge and varnish total ratings with merit ratings established by the bench test of this invention.

TABLE IV

*Merit Rating of Reference Oils*

| Reference Oil | Field Test | Bench Test | Laboratory Engine |
|---|---|---|---|
| REO-132 | 25.4 | 40 | 68.7 |
| REO-133 | 55.0 | 50 | 85.4 |
| REO-138 | 57.4 | 77 | 68.7 |
| REO-137 | 70.1 | 97 | 81.3 |

The reference oils are rated by the test of this invention in the same order of quality as the field test. The laboratory engine, equipped with a sludge box, and operated under low temperature cycling conditions does not rate the reference oils in the same order as the field tests.

Later, an additional pair of oils known as $x$ and $y$ were tested by the method of this invention using another batch of synthetic sludge precursor made by partial catalytic oxidation under non-combustive conditions, and another test stand. Again the field test quality of these oils is rated correctly by the bench test.

TABLE V

*Merit Ratings of References Oils $x$ and $y$*

| Reference | Field Test | Bench Test | Lab. Engine |
|---|---|---|---|
| y | 52.5 | 40 | 79 |
| x | 71.3 | 56 | 82.9 |

The reliability of the test method of this invention is further confirmed by further tests which have been run and which have always corroborated established field results. Among these are the inability of metallic detergents to prevent sludge accumulation under low temperature service and the quality of certain polymeric detergents. The industry considers the Caterpillar L-1 test as the most reliable test for detergency. Many specifications use this test as the criteria of final acceptance for crankcase oils. This test conducted in a high speed diesel engine using injection of low vapor pressure fuel has little value in predicting cleanliness of a gasoline engine equipped with a carburetor and using a different fuel. Furthermore, such laboratory engine tests are too costly and time consuming for evaluating a great number of possible compounds and formulations.

A number of bench tests have been designed around the ability of a lubricant to maintain suspensions of soot or of carbon black under various conditions. Such tests may give some indication of lubricant quality in relation to diesel engines but do not correlate with gasoline engine cleanliness where soot is not formed. Further, the many bench tests which are based on the results of lubricant oxidation obviously are not applicable to low temperature lubrication of a gasoline engine when the lubricant is not oxidized. The novelty and the usefulness of the test method of this invention consists of adding sludge precursors to the test lubricant, then subjecting it to contact with nitrogen dioxide. By this method the lubricating oil is not oxidized to degradation products but displays its detergent properties by preventing sludge deposition. Furthermore by increasing the boiling range of the gasoline to the boiling range of diesel fuel, adding soot or carbon black, operating at higher temperatures and adjusting the concentration and flow rate of nitrogen, oxygen and nitrous oxide, the detergency properties of diesel engine lubricating oils may be tested.

I claim:

1. In a method for testing the low temperature detergency of a mineral lubricating oil, the step which comprises subjecting to nitrogen dioxide gas at a temperature of about 50° to 400° F. a mixture of the lubricating oil and about 5 to 50% by weight of an oil-soluble cracked gasoline fraction which has been partially oxidized under non-combustive conditions.

2. The method of claim 1 which includes the step of forming nitrogen dioxide from nitric oxide and oxygen.

3. The method of claim 1 where the nitrogen dioxide is mixed with an inert gas.

4. The method of claim 3 where the inert gas is nitrogen.

5. The method of claim 1 where the temperature is about 150° to 250° F.

6. The method of claim 1 where the lubricating oil is mixed with 5 to 20% by weight of an oil-soluble cracked gasoline fraction boiling primarily in the range of about 300 to 425° F. which has been partially oxidized.

7. The method of claim 6 where the temperature is about 150° to 250° F.

8. In a method for testing the low temperature detergency of a mineral lubricating oil wherein a treated oil mixture is allowed to settle and the redispersibility of components of the mixture is determined, the treating step which comprises subjecting the oil, in admixture with about 5 to 50% by weight of an oil-soluble cracked gasoline fraction which has been partially oxidized under non-combustive conditions, to nitrogen dioxide gas at a temperature of about 50° to 400° F.

9. The method of claim 1 in which nitrogen dioxide is provided in amounts from about 0.05–1.0 liter per hour per 100 grams of said oil-cracked gasoline mixture.

10. The method of claim 8 in which nitrogen dioxide is provided in amounts from about 0.05–1.0 liter per hour per 100 grams of said oil-cracked gasoline mixture.

11. The method of claim 10 in which the cracked gasoline fraction has been partially oxidized to an acid number of about 3–25.

12. The method of claim 10 in which nitrogen is provided in mixture with said nitrogen dioxide in amounts of about 0–50 liters per hour per 100 grams of oil.

13. The method of claim 1 in which the cracked gasoline fraction has been partially oxidized to an acid number of about 3–25.

14. In a method for testing the low temperature detergency of a mineral lubricating oil, the step which comprises subjecting to a gas consisting essentially of nitrogen dioxide, oxygen and nitrogen at a temperature of about 150–250° F., a mixture of the lubricating oil and 5–20% by weight of a cracked gasoline fraction boiling primarily in the range of about 300–425° F. which has been partially oxidized to an acid number of about 10–15, said nitrogen dioxide gas being provided in amounts from about 0.05–1.0 liter per hour per 100 grams of said oil-cracked gasoline mixture and said nitrogen being provided in amounts of about 4–7 liters per hour per 100 grams of said oil.

References Cited in the file of this patent

Talley et al.: "Anal. Chem.," vol. 15, 1943, pages 91–95.

"Znidema Performance of Lubricating Oils," (1952) edition, pages 40–58.